(12) United States Patent
Carroll

(10) Patent No.: US 8,271,005 B2
(45) Date of Patent: Sep. 18, 2012

(54) MOBILE COMMUNICATION DEVICE AND SYSTEM WITH LIMITED DATA TRANSFER

(75) Inventor: David W. Carroll, Grantsburg, WI (US)

(73) Assignee: JLT Group, Inc., St. Paul, MN (US)

( * ) Notice: Subject to any disclaimer, the term of this patent is extended or adjusted under 35 U.S.C. 154(b) by 921 days.

(21) Appl. No.: 12/352,394

(22) Filed: Jan. 12, 2009

(65) Prior Publication Data

US 2010/0180190 A1    Jul. 15, 2010

(51) Int. Cl.
*H04W 4/00* (2009.01)
*H04M 11/10* (2006.01)

(52) U.S. Cl. ............. 455/466; 455/413; 455/412.1; 455/566; 455/550.1

(58) Field of Classification Search ............ 455/412.1, 455/412.2, 413, 466, 550, 566
See application file for complete search history.

(56) References Cited

U.S. PATENT DOCUMENTS

| | | | |
|---|---|---|---|
| 5,818,447 A | 10/1998 | Wolf et al. | |
| 6,065,041 A | 5/2000 | Lum et al. | |
| 6,078,322 A | 6/2000 | Simonoff et al. | |
| 6,226,533 B1* | 5/2001 | Akahane | 455/566 |
| 6,327,608 B1 | 12/2001 | Dillingham | |
| 6,996,395 B2* | 2/2006 | Rodriguez et al. | 455/412.2 |
| 7,133,687 B1* | 11/2006 | El-Fishawy et al. | 455/466 |
| 7,155,681 B2 | 12/2006 | Mansour et al. | |
| 7,167,702 B2* | 1/2007 | Otsuka | 455/413 |
| 7,437,312 B2* | 10/2008 | Bhatia et al. | 705/26.64 |
| 2002/0028670 A1* | 3/2002 | Ohsuge | 455/413 |
| 2002/0152244 A1 | 10/2002 | Dean et al. | |
| 2002/0154162 A1* | 10/2002 | Bhatia et al. | 345/745 |
| 2002/0188661 A1* | 12/2002 | Casais | 709/202 |
| 2003/0041240 A1* | 2/2003 | Roskind et al. | 713/168 |
| 2004/0014456 A1* | 1/2004 | Vnnen | 455/413 |
| 2004/0092252 A1* | 5/2004 | Gustavsson et al. | 455/412.2 |
| 2004/0181749 A1* | 9/2004 | Chellapilla et al. | 715/505 |
| 2005/0028082 A1* | 2/2005 | Topalov et al. | 715/505 |
| 2007/0101419 A1* | 5/2007 | Dawson | 726/9 |
| 2007/0180380 A1* | 8/2007 | Khavari et al. | 715/704 |
| 2007/0300161 A1* | 12/2007 | Bhatia et al. | 715/745 |
| 2008/0178270 A1* | 7/2008 | Buss | 726/5 |
| 2009/0005012 A1* | 1/2009 | van Heugten | 455/413 |

FOREIGN PATENT DOCUMENTS

| | | |
|---|---|---|
| EP | 0 905 627 A1 | 3/1999 |
| WO | 99/63430 A1 | 12/1999 |
| WO | 01/18691 A2 | 3/2001 |
| WO | 01/18691 A3 | 3/2001 |
| WO | 01/75614 A1 | 10/2001 |

* cited by examiner

*Primary Examiner* — Lewis West
(74) *Attorney, Agent, or Firm* — Dicke, Billig & Czaja, PLLC

(57) ABSTRACT

A portable user interface device for performing wireless communications. The device includes a case, a display screen, a speaker, a microphone, a sensor, and a computer. The computer is disposed behind the display screen to define a display side, and the sensor is located adjacent the display side. The computer is programmed to control operation of the display screen and to operate a wireless form-filling module, a wireless data transfer module, and an application module. The form-filling module is of a type adapted to promote source data-type interface with a client server servicing the user interface device and limited data transfer capacity. The data transfer module includes a wireless transceiver and is adapted to communicate with a data transfer service on a non-priority, limited size basis. The application module performs a designated operation via the form-filling module and the data transfer module, displaying indicia immediately adjacent the sensor.

20 Claims, 4 Drawing Sheets

MOBILE COMMUNICATION DEVICE AND SYSTEM WITH LIMITED DATA TRANSFER

BACKGROUND

The present disclosure relates to wireless communication devices and systems. More particularly, it relates to a mobile user interface useful in performing communication-type operations, such as voice messaging, on an inexpensive basis or platform, and related data transfer systems and methods.

Portable computers in laptop and tablet formats for communication and computing activities have recently been revised to even smaller form factors for more convenient portability. Examples include Apple's iPhone™, RIM's Blackberry™, and other similar devices. While highly popular, these solutions require high data rate wireless interfaces to satisfy corresponding applications made available with the devices. For example, high data rate interface is required to facilitate creation/display of images on the device along with contiguous communication voice exchanges. While the initial cost or purchase price of these and similar products is somewhat affordable, the true cost is buried into a required, multi-year service contract. Due in large part to the high data rate wireless connections, the service contracts are quite costly, rendering the device simply out of reach for many individuals. Simply stated, many low-income individuals, both in the United States and worldwide, who otherwise greatly desire the ability to engage in wireless communications (and possibly other, mobile computing activities), cannot make use of this technology because of the inordinate, overall costs.

In addition to high connectivity costs, currently available, high-technology mobile support devices (that otherwise facilitate communication and computing operations) incorporate multiple applications that are of limited interest to many potential end users. Oftentimes, applications available on a particular mobile computing device are never even used, such that an end user is effectively paying for unwanted capabilities. On a related point, the availability of multiple applications and related format interfaces can be quite confusing and requires training to fully understand. This shortcoming may dissuade a potential user from actually purchasing a device.

In light of the above, a need exists for a mobile communication device and related wireless interface system that is intuitive to operate and facilitates low-cost wireless interface.

SUMMARY

Some aspects in accordance with the present disclosure relate to a portable user interface device for performing wireless communications. The device includes a case, a display screen, a speaker, a microphone, a sensor, and a computer. The case maintains the remaining components, with the computer being disposed behind the display screen to define a display side, and the sensor being located adjacent the display side. The computer is programmed to control operation of the display screen and to operate a wireless form-filling module, a wireless data transfer module, and an application module. The form-filling module is of a type adapted to promote source data-type interface with a client server with limited data transfer capacity. The data transfer module includes a wireless transceiver and is adapted to communicate with a data transfer service on a non-priority, limited size basis. The application module is adapted to facilitate performance of a user-designated operation via the form-filling module and the data transfer module. In this regard, the application module prompts automatic display of assigned title indicia on the display screen immediately adjacent the sensor and performs the user-designated operation as a function of an input signal from the sensor. In some embodiments, the user-designated operation is voice messaging, and the application module is programmed to determine, and prompt the display screen to display, maximum message length information in accordance with limited size parameter of the data transfer module.

Other aspects in accordance with the present disclosure relate to a method of performing wireless communications. The method includes providing a portable user interface device as described above. The device is operated by a user to record a voice message from the user. In this regard, a voice message user interface form is displayed on the display screen and the user is prompted to enter a time-limited voice message via the microphone. The voice message is recorded and stored. A device identification key or identifier is electronically associated with the stored voice message to generate a voice message data string. The voice message data string is wirelessly signaled from the user interface device to a transceiver tower of a data transfer service. The data transfer service, in turn, recognizes the voice message data string as a non-priority item based upon reference to the identification key. Finally, the voice message data string is wirelessly signaled from the data transfer service to a client server. In some embodiments, the method further includes connecting the user interface device to a secondary computer that in turn is electronically connected to a designated website. A portion of a form operated by the application module is then altered via the secondary computer and the website.

DETAILED DESCRIPTION

Figure 1:
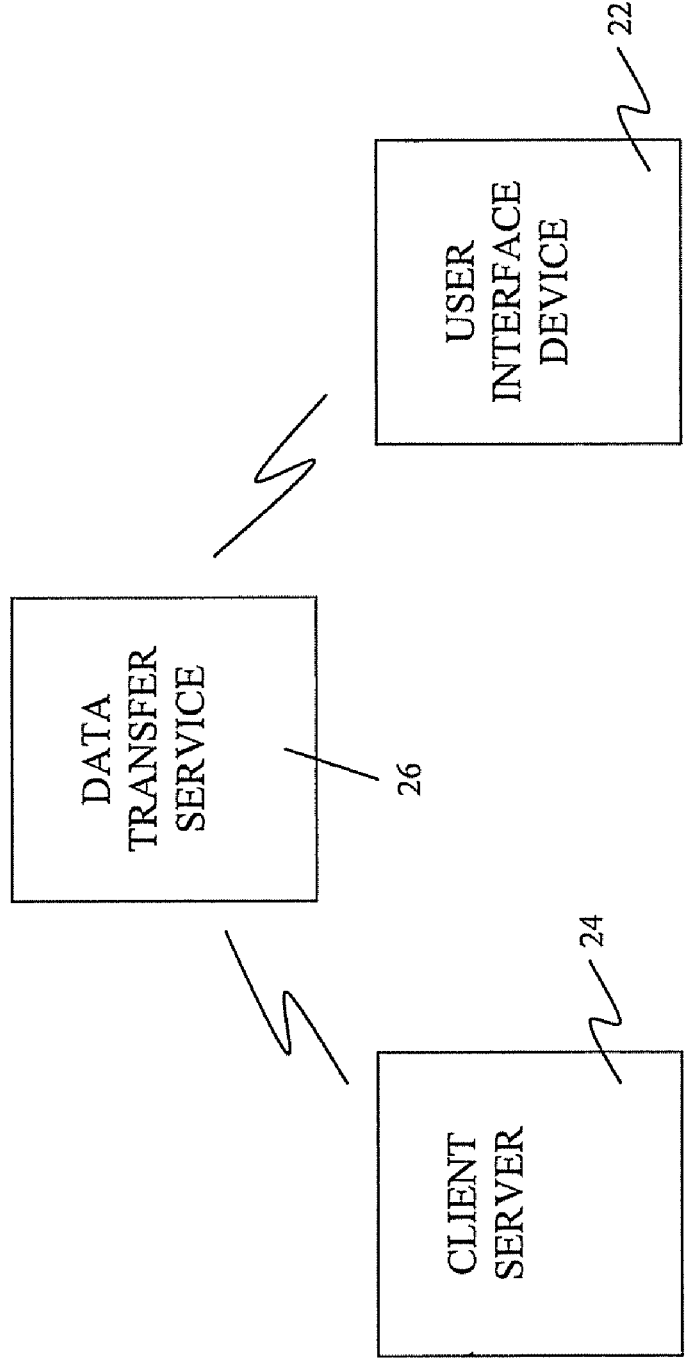
FIG. 1 is a block diagram of a wireless communications system in accordance with the present disclosure.

One embodiment of a wireless communication system 20 in accordance with present disclosure is shown in block form in FIG. 1. The system 20 includes a portable user interface device 22, a client server 24, and a data transfer service 26. Details on the various components are provided below. In general terms, however, the user interface device 22 is programmed to perform one or more pre-determined operations or applications, including a voice messaging operation. In this regard, the user interface device 22 is further programmed to signal information, such as a voice message data string, to the data transfer service 26. The data transfer service 26, in turn, receives information from the user interface device 22, and transmits corresponding information to the client server 24 for subsequent processing. To this end, interaction between the user interface device 22 and the data transfer service 26 is on a non-priority basis, such that the corresponding fees charged by the data transfer service 26 are greatly reduced (as compared to "normal" fees charged by the data transfer service 26 for wireless transmissions). The client server 24 interfaces with the data transfer service 26 on a similar basis, and can effectuate delivery of the voice message to an intended recipient. All connectivity with the data transfer service 26 is secondary (low priority) to full transceiver tower transactions. As a result, the system 20, and in particular the user interface device 22, presents a low cost solution to end users desiring at least basic, wireless communication capabilities.

Figure 2:
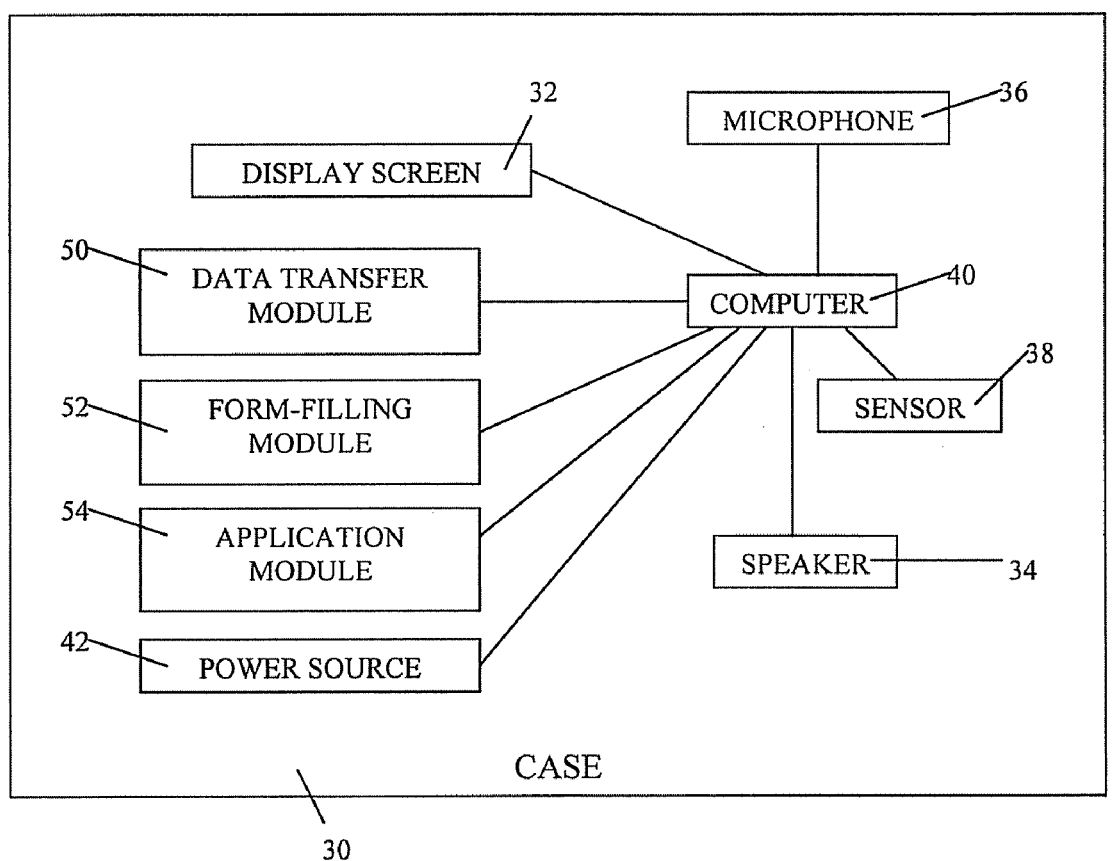
FIG. 2 is a block diagram of a user interface device useful with the system of FIG. 1.

The user interface device 22 can assume a variety of forms. With additional reference to FIG. 2, in some constructions the user interface device 22 includes a case 30 maintain various components such as a display screen 32, a speaker 34, a microphone 36, one or more sensors 38, a computer 40, and an optional power source 42 (e.g., a battery). The computer 40 is electronically connected to, and controls operation of, the components 32-38, and can be small format computing device incorporating a microprocessor/chip (e.g., an Intel processor). Regardless, the computer 40 is programmed to include, or operate upon, several modules, including a wireless data transfer module 50, a wireless form-filling module 52, and an application module 54.

The wireless data transfer module 50 is configured to wirelessly interface with the data transfer service 26 (e.g., send and receive digital signals), and includes circuitry components necessary for such interactions as are known in the art (e.g., a transceiver component). Further, the wireless data transfer module 50 is programmed to facilitate the low cost interface with the data transfer service 26 mentioned above. As a point of reference, the data transfer service 26 is, or includes, a convention cell phone tower. While most cell phone towers are essentially constantly sending and receiving signals, there are periods of higher use, and periods of lower use. Further, most of the time there remains unused "send and receive" space on cell phone towers. In fact, even when the tower is considered "full," there are spaces sufficient for a small, quick transfer of data. As a result, cell phone tower operators are willing to sell data transfer activities across the cell phone tower at greatly reduced rates during these periods of lower use (or unused space) and/or data transfer in and around full duplex communication. With this understanding in mind, the system 20 makes use of "non-priority" communications/transfers with the data transfer service 26, where "non-priority" is in reference to the data transfer service 26 sending/receiving data transmissions as part of the system 20 only at limited, pre-determined times and/or only of limited, predetermined sizes. The limited times and/or sizes are agreed to by the data transfer service 26 as part of a service contract with a user of the system 20 (i.e., operator of the user interface device 22), and are at greatly reduced rates (as compared to the fees associated with service contracts normally incurred by users of conventional mobile communication and computing devices). The client server 24 interfaces with the data transfer service 26 in a similar fashion. Thus, data can flow from the user interface device 22 to the client server 24 via the data transfer service 26; where the data is a voice message (for example), the client server 24 subsequently operates to "push" forward the voice message to an intended recipient via, for example, the data transfer service 26.

In light of the above, the data transfer module 50 is programmed to electronically attach an identifier tag or "key" to any transmission signaled by the user interface device 22. The identifier tag identifies the data transmission as having been generated by the device 22; the data transfer service 26, in turn, recognizes the identifier tag and the corresponding transmission signal as being associated with a customer having a non-priority arrangement with the data transfer service 26. With this recognition in mind, and pursuant to the service arrangement with the user of the user interface device 22, the data transfer service 26 will process the transmitted signal on a non-priority basis. That is to say, the data transfer service 26 will not automatically or immediately process/re-transmit a signaled transmission from the user interface device 22; instead, the data transfer service 26 will only process/re-transmit the data transmission at times and/or data string sizes commensurate with the service arrangement with the user. Effectively, then, the identifier tag incorporated by the data transfer module 50 is interpreted by the data transfer service 26 as a non-priority request for transfer; the data transfer service 26 acts upon this request on a non-priority basis.

As mentioned above, the reduced service fees associated with the system 20 can be based on time of transmissions to the data transfer service 26, size of the transmissions, or both. The data transfer module 50 can be programmed to implement the size limitation requirements. For example, the data transfer module 50 can be programmed with a maximum data transmission size or length parameter, such that the data transfer module 50 will attenuate or otherwise simply not transmit any data string that exceeds the established limit. This same maximum size parameter can be communicated or acted upon by the form-filling module 52 and/or the application module 54 in effectuating performance of an application/operation desired by a user of the device 22, or can be programmed directly into the corresponding module 52 or 54. Regardless, data transmissions to the data transfer service 26 are non-priority and of limited size.

The form-filling module 52 facilitates necessary functionality of the device 22 while operating on a size-limited transmission basis. In some embodiments, the form-filling module 52 operates as a relatively thin client for reduced client-side resource demands by employing a distributed user interface architecture as described, for example, in U.S. Pat. No. 7,155,681 entitled "Platform-Independent Distributed User Interface Server Architecture," issued Dec. 26, 2002 and the entire teachings of which are incorporated herein by reference. In general terms, the distributed user interface architecture maintains or emulates a persistent state connection with the client server 24 that functions as a terminal session, and only transmits data and a brief description of how to display it. The form-filling module 52 produces "standard" user interface forms, and fills the "open" form locations with the transmitted data. The result is that there is no need to "round-trip" every entry on the user interface device 22; data can then be transmitted in bundles that make more efficient use of each transmitted data packet. The form-filling module 52 maintains a list of different form definitions corresponding to the computer 40 platform and particular screen shots of the application associated with the application module 54. In addition, the form-filling module 52 can save cached copies of these form definitions.

The application module 54 is, in some embodiments, adapted or programmed to perform a voice messaging operation. More particularly, the application module 54 operates to intuitively guide a user of the device 22 in recording a desired voice message for delivery to an intended recipient in a format dictated by the form-filling module 52 and acceptable for transmission via the data transfer module 50 (i.e., limited size transmission). The microphone 36 is utilized by the user for orally inputting the desired voice message. The application module 54 interfaces with the display screen 32 and the sensor(s) 38 to assist the user in quickly and easily creating an appropriate voice message (e.g., in terms of length and designated recipient).

Figure 3:
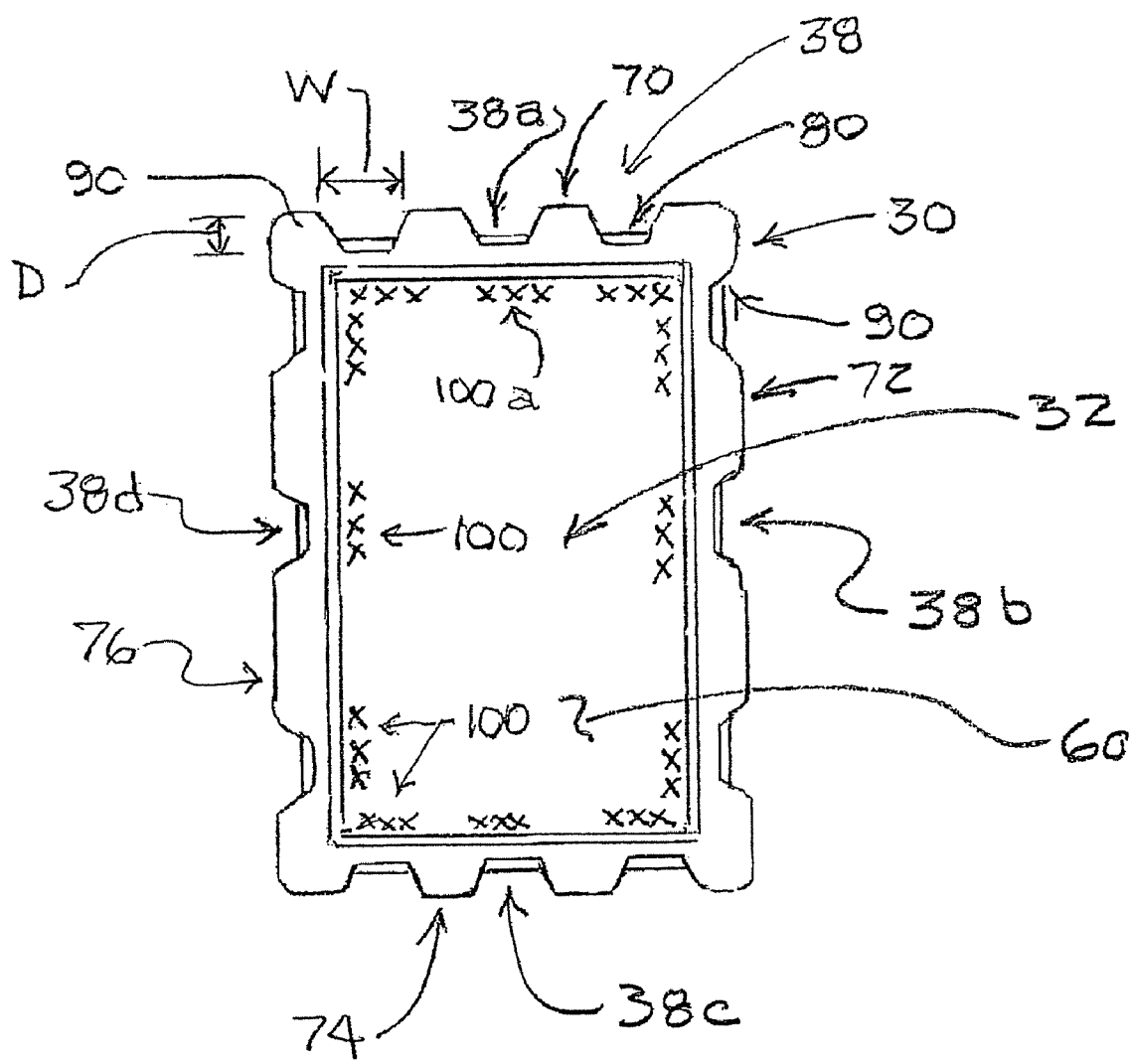
FIG. 3 is a top plan view of the user interface device of FIG. 2.

Programming of the application module 54 for purposes of performing a voice messaging operation is better understood with reference to FIG. 3 that otherwise illustrates one embodiment of the user interface device 22 in final form. Once again, the user interface device 22 includes the case 30 that maintains the display screen 32. The computer 40 (hidden in FIG. 3) is maintained by the case 30 "behind" the display screen 32 such that the display screen 32 can be described as having a display side 60 opposite the computer 40 and at which information is displayed to/viewable by a user (not shown). With the one embodiment of FIG. 3, the case 30 defines four perimeter edges 70-76, with the display side 60 being internally off-set from the edges 70-76.

In addition, the user interface device 22 includes a plurality of the sensors 38, including, for example, first-fourth sensors 38a-38d. The sensors 38a-38d can assume a variety of forms (e.g., mechanical switch, membrane touch sensor, low voltage finger touch switch, etc.), and include an actuator portion 80. The actuator portion 80 is generally configured to generate a signal (mechanical or electrical) when interfaced by a user's fingertip. With this in mind, the case 30 is configured to peripherally protect the actuator portion 80 of each of the sensors 38 to prevent unintentional or accidental actuation thereof by the user. In other words, the case 30 is configured such that the sensors 38 are only "activated" when intentionally done so by a user. For example, the case 30 can form a plurality of notches 90 within which respective ones of the actuator portions 80 are disposed. With respect to the one notch 90 identified in FIG. 3, the notch 90 is defines a depth D and width W. The actuator portion 80 of the corresponding sensor 38 is disposed within the depth D. Further, the width W (as well as the spatial location of the actuator portion 80 relative to the depth D) is selected in accordance with the form factor associated with a human adult fingertip (e.g., the width W is on the order of 0.25-0.5 inch in some embodiments). With this construction, then, a concerted action by the user of pressing his/her fingertip into the notch 90 is required before the corresponding sensor 38 is interpreted by the user interface device 22 as having been actuated.

With the one embodiment of FIG. 3, the user interface device 22 is configured to provide the sensors 38 at spaced locations about an entire perimeter of the case 30. Thus, the first sensor 38a is disposed along the first edge 70, the second sensor 38b is disposed along the second edge 72, etc. Alternatively, any other number of the sensors 38, either greater or lesser, is also acceptable. For example, one or more of the edges 70-76 need not include or maintain any sensors 38.

Regardless of the number and/or location of the sensors 38, the application module 54, in conjunction with the form-filling module 52, operates to automatically display pre-determined title indicia 100 relating to performance of the selected application on the display screen 32 in close proximity (i.e., immediately adjacent) a pre-determined one of the sensors 38 (and in particular the corresponding actuator portion 90). The pre-determined title indicia 100 can assume a variety of forms, and intuitively informs the user as to the operation or command effectuated upon actuating the corresponding sensor 38.

For example, in the context of one example application of voice messaging, the pre-determined title indicia 100a automatically displayed on the display screen 32 immediately adjacent the first sensor 38a can be the word "record" (or an icon readily identified by a user as indicating a "record" command). Under these circumstances, the application module 54 in performing a voice messaging application, is programmed to initiate "recording" of a voice message in response to user actuation of the first sensor 38a. Other, additional pre-determined title indicia 100 (and corresponding commands acted upon by the application module 54 in performing a voice message operation) can be provided, such as "send", "erase", "play", etc. Regardless, the same pre-determined title indicia 100 are always displayed when in conjunction with the selected operation (e.g., voice messaging). Where the user interface device 22 is programmed to perform different operations (e.g., voice messaging and e-mail), the pre-determined title indicia 100 can differ between applications (e.g., "record" in a voice messaging application and "copy" in an email application). Further, one (or more) of the pre-determined title indicia can relate to switching between available applications. This feature may alternatively be activated by using more than one sensor (e.g., actuating two or more of the sensors 38).

As indicated above, operation of the system 20 (FIG. 1) as a low cost service is premised, in some embodiments, upon the user interface device 22 sending limited size data transmissions to the data transfer service 26. In the context of a voice messaging operation, then, a time length of the voice message is limited by the data transfer maximum size parameters agreed to by the user and the data transfer service provider. With this in mind, in some embodiments the application module 54 is programmed to provide a user, via the display screen 32, with information indicative of this time limitation while recording a voice message. For example, the application module 54 can be programmed with a pre-determined maximum message time length value; the application module 54 can reference the pre-determined maximum size parameter stored by the data transfer module 50 in designating a pre-determined maximum message time length value; etc. Regardless, with this pre-determined maximum message time length value in mind, the application module 54 prompts the display screen to display, and continuously update, information informing the user of time remaining for recording a current voice message.

The displayed time remaining information essentially serves as a comparison between the length of a voice message currently being recorded and the pre-determined maximum message time length value, and can assume a variety forms. For example, the display can include a representation of a clock, with the elapsed time of the voice message currently being recorded being constantly updated and displayed in a manner that visually alerts the user as to whether the maximum time length is being approached (e.g., a representation of a clock that slowly "fills" in a clockwise direction as time elapses while the current message is being recorded). Alternatively, an hour glass can be displayed, etc. Even further, the time remaining can be displayed in numerical form (e.g., minutes and seconds). Once the pre-determined maximum time length value is reached, the application module 54 automatically stops the recording operation and in some embodiments provides the user with a visual warning that the maximum time has been exceeded. By limiting the length or size of the recorded voice message, then, the application module 54 ensures that the resultant voice message transmitted by the user interface device 22 will be in accordance with the acceptable date size limitations established by the data transfer service 26. Similar size-limiting actions can be implemented for other applications (e.g., multiple incoming voice mail messages can be automatically partitioned that exceed a pre-determined limit)

An additional, option feature provided with the application module 54 and/or the form-filling module 52 that further compliments the limited-size data transmission attributes of the system 20 in performing voice messaging operations relates to the manner in which a user selects and/or indicates an intended recipient of a recorded voice message. In some constructions, the pre-determined title indicia 100 can include a "reply" command associated with one of the sensor 38, with the application module 54 programmed to interpret actuation of the corresponding sensor 38 as a command from the user to simply "reply" to a message currently being viewed/listened to by the user. Under these circumstances, the intended recipient is quickly selected by the user, and readily understood/implemented by the application module 54. In addition or alternatively, the application module 54 can be programmed to store and selectively display contact information for one or more potential recipients in a form-filling manner. More particularly, the form-filling module 52 can incorporate a contact designation form, with the application module 54 prompting the user interface device 22 to retrieve corresponding form-filling information from the client server 24 upon receiving a user command at a designated one of the sensors 38 (it being understood that the pre-determined title indicia 100 can associate word(s)/icon(s) with the appropriate sensor 38 on the display screen 32 to enable a user to perform this function).

In some constructions, the user interface device 22, and in particular the modules 50-54, is configured such that a user cannot alter one or more performance attributes (e.g., the available form(s), the pre-determined title indicia, adding/editing recipient contact information, etc.) using only the device 22 itself. In this way, computing capabilities of the computer 40 can be reduced, and conventional user interface components (e.g., keyboard, mouse, etc.) are not necessary. This, in turn, desirably reduces the costs and size of the user interface device 22. As a point of reference, the user interface device 22 of FIG. 3 is sized to be highly thin (e.g., thickness of less than 0.5 inch) and pocketable, having length and width dimensions of less than 4 inches.

In light of the above, in some embodiments, the system 20 is further configured to include a secondary computer having internet connection capabilities, as well as a designated website adapted to facilitate user alteration of the user interface device 22. The secondary computer can be the client server 24, or can be any other computer that is connectable to the internet. Further, the user interface device 22 incorporates features that permit electronic connection (wired or wireless) to the secondary computer (e.g., a USB port, etc.). Regardless, one connected to the secondary computer, the secondary computer is operated over the internet to link with the designated website. The website, in turn, enables user alteration of the user interface device 22 and/or of information stored at the client server 24 via the secondary computer (e.g., the keyboard and/or mouse of the secondary computer is employed to enter desired changes). The alterations can include, for example, deleting or changing the format of one or more of the pre-determined title indicia 100 or adding new pre-determined title indicia that is otherwise displayed in connection with a selected application (e.g., the voice messaging application); deleting, changing or editing recipient contact information; etc.

While the system 20 of the present disclosure has been described as performing voice messaging operations, one or more additional wireless operations can be included. For example, the user interface device 22 can be adapted to send and receive e-mails, interface with internet websites, perform computing-type operations, etc. Thus, the application module 54 is not limited to voice messaging applications and/or other, additional modules can be included.

Figure 4:
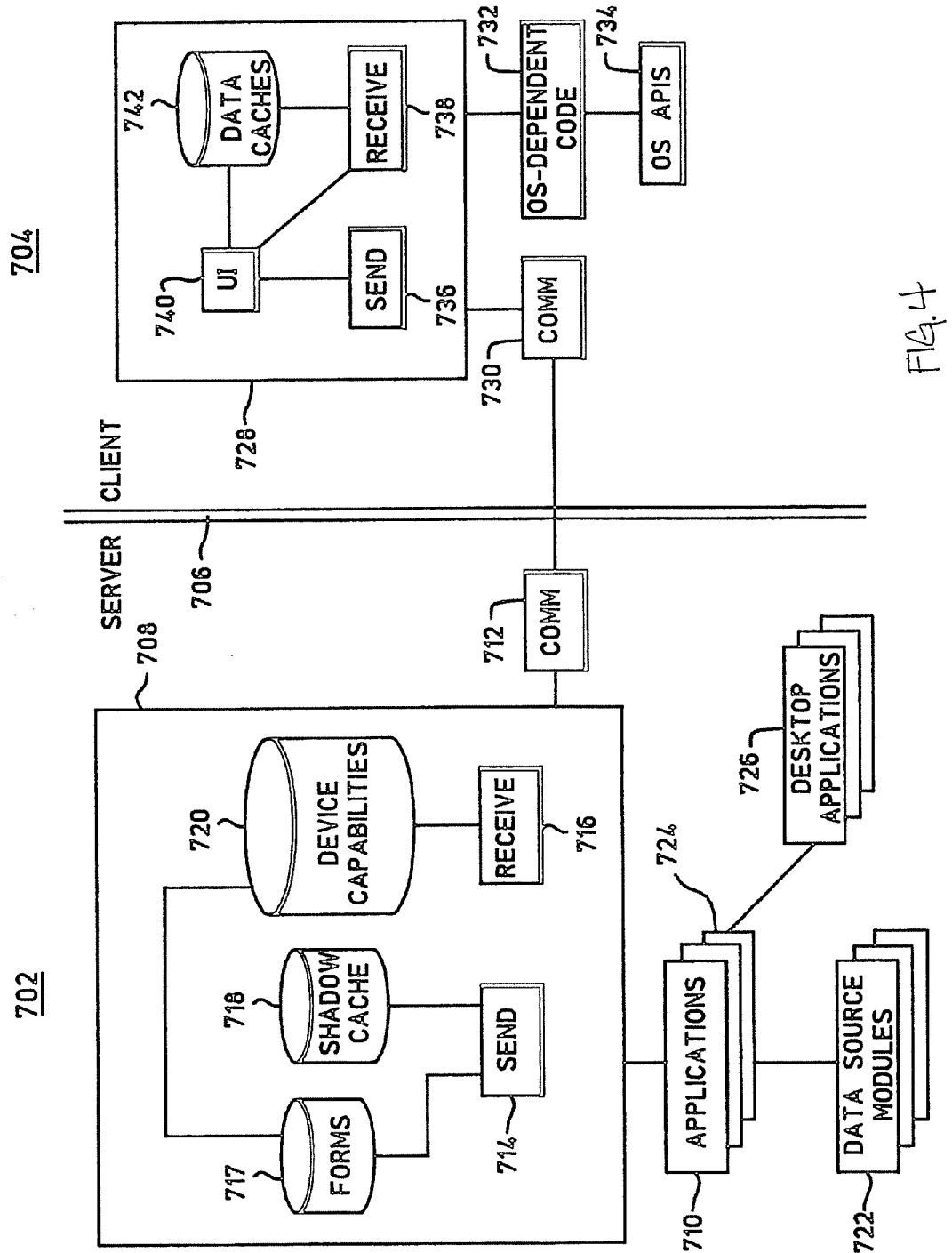
FIG. 4 is a schematic representation of server and user interface components of one available distributed user interface or wireless communications system useful with the present disclosure.

FIG. 4 is a schematic representation of the server and client components of an example wireless communication system in accordance with the present disclosure and in the form of distributed user interface (UI) system). The elements shown in FIG. 4 may represent software programs, software program modules, functional components, processing tasks or threads, memory elements, application program code segments, or the like. In a practical system, the server-side elements shown in FIG. 4 are included in a client server processing architecture 702 resident at the client server (or UI server), while the client-side elements shown in FIG. 4 are included in a client processing architecture 704 resident at the user interface device (or client device). Each of these processing architectures may be realized with one or more processor devices and any number of memory devices (not shown in FIG. 4).

Briefly, the client server processing architecture 702 includes a client server application 708 that communicates with one or more server-based applications 710 and with a first communication interface element 712. The client server application 708 includes or is otherwise associated with a server send element 714, a server receive element 716, a client forms database element 717, a shadow cache element 718, and a device capabilities storage element 720. The server-based applications 710 may communicate with one or more data source modules 722 (which in turn communicate with any number of data servers). The client server processing architecture 702 may also support a desktop application launcher (which can be realized as another instance of applications 710), which communicates with one or more optional desktop applications 726 available to the end user.

The user interface device processing architecture 704 includes a user interface device application 728 that communicates with a second communication interface element 730. The first and second communication interface elements 712, 730 are suitably configured to communicate with each other and to facilitate the transmission and reception of source data items, control commands, action requests, and other commands that may be sent between the user interface device and the client server (it should be appreciated that the client server and the user interface device may utilize any number of known techniques to carry out the actual transmission, reception, and exchanging of information; the communication interface elements 712, 730 are used in the practical embodiment shown in FIG. 4). The user interface device application 728 includes or is otherwise associated with a user interface device send element 736, a user interface device receive element 738, a user interface device UI module 740, and one or more user interface device data caches 742. User interface device application 728 also functions in cooperation with OS-dependent code 732 and a number of OS application program interfaces (APIs) 734. These OS-related elements may represent memory allocation APIs, thread creation APIs, interprocess communication APIs, mechanisms to retrieve messages from UI controls, or the like. By separating the client application modules from the OS-dependent code 732 and the OS APIs 734, the client architecture can be ported easily to different existing user interface device platforms.

FIG. 4 depicts the client server and the user interface device in a connected mode that supports two-way communication over a data transfer service network. Although such a connected mode is utilized during each communication session, the client server and the user interface device can operate independently and individually in an offline manner. In other words, a permanent or continuous session need not be maintained between the client server and the user interface device. For purposes of this example, the client server and user interface device are suitably connected in a manner that avoids a firewall 706. For example, in the preferred embodiment, the client server communicates with the client device via a port. In a preferred wireless embodiment, the two communication interface elements utilize a suitable protocol other than HTTP, which can be cumbersome and not particularly efficient for purposes of the distributed UI system. For example, the communication interface elements may employ a private protocol having the following characteristics: less descriptive overhead than HTML; ability to transmit only the requested source data items rather than all of the data associated with a web page; and ability to support an extensive list of commands that facilitate additional interactivity. Of course, certain deployments, e.g., a desktop network arrangement, may utilize HTTP.

In practice, the communication interfaces 712, 730 will be provided by suitable executable program modules (such as Dynamic Link Libraries (DLLs)) resident at the client device and the UI server. The communication DLLs include, but are not limited to, various functions that manage communications between the user interface device and the client server. For example, the communication DLLs may carry out data compression, encryption, port selection, making any pointers self-relative, word size and byte order management (the UI server may take care of these for the client), and socket management. The server-side communication DLL selects a port, for example standard HTTP Port, to establish the communication session, and determines how to contact (or listen for) the client. The server-side communication DLL reports dropped connections to the respective server-based applications 710, but the DLL remains responsible for reconnecting to the user interface device. In other configurations, the client device can connect to the client server.

As mentioned briefly above, the client server employs a client server processing architecture 702. Processing architecture 702 may include any number of server-based applications 710, which are preferably driven by client server application 708 (in a practical implementation, client server application 708 is realized as a single executable, i.e., a single ".exe" that serves as a driver application). The client server application 708 can function as a "caller" that communicates information to and from the communication interface element 712. Briefly, the client server application 708 performs those server-side tasks and processes that are not otherwise handled by the server communication interface element 712 or the server-based applications 710. For example, the client server application 708 can perform any of the following tasks: call the communication interface element 712 to establish a connection; manage connects, reconnects, and multiple clients; monitor which server-based applications are installed and available; switch between the server-based applications; load the server-based applications and dispatch messages to them; and provide a number of common functional features, e.g., creating form definitions, calculating font widths, and the like. Notably, the client server application 708 may also include other functions that are common to more than one application. For example, it may include device capability information and application registration features.

The main loop of the client server application 708 obtains input from the client device via the server receive element 716, and dispatches commands to the appropriate handling routine associated with the current server-based application (in a practical embodiment, the server-based applications 710 will register a DLL with some standard dispatch entry points). The current application 710 can then call an API associated with the communication interface element 712 to send data to the device. The sending of data is performed by the server send element 714 (thus, client server application 708 on threaded systems preferably has global data for a "send" queue, a way to wake up the server send element 714, and a flag to interrupt the server send element 714). During operation, client server application 708 maintains a "send" queue that contains a list of data items, commands, and other information to be sent to the client device.

Although not a requirement for the system to function, the preferred practical embodiment utilizes at least two threads in the client server application 708, e.g., a server send thread and a server receive thread. Separating the sending and receiving threads is desirable to ensure that individual operations can be easily canceled, particularly in view of the manner in which the client server processes and sends information in "chunks" to the user interface device. Thus, the server send thread can handle cancellations and state changes obtained from the server receive thread, which collects commands, input, and information from the client in an independent manner. It is possible, however, to implement this code in non-threaded modules; such an implementation may be preferable in a scalable server environment.

The server-based applications 710 can represent any number of different applications, features, or functions including the voice messaging application described above, as well as optionally other applications, e.g., an email application, a calendar application, an address book or contact list, a chat application, a task reminder list, an alarm feature, a messaging service, or any other application that could run on a desktop (or other) computer. These applications reside primarily at the client server, which handles most, if not all, of the application processing on behalf of the user interface devices. Other than telling the user interface device what UI changes to make based on the current UI state and actions selected by the user, the job of the client server is basically to be a remote data source. The primary difference between this type of data source and typical ones is simply that the client need not know the names, types, or source of the data; the client server is responsible for obtaining and formatting the data for the client based on a data ID that the client server associates with the control descriptions in the form definition. Notably, the client server can be configured to communicate with and support multiple data sources for any given server-based application 710. For example, PIM applications may utilize a number of different data sources, e.g., MICROSOFT EXCHANGE™, STARFISH ORGANIZER™, NOVELL COMMUNICATOR™, and the like. Accordingly, each of the server-based applications 710 preferably contains an interface to a per-application data source module 722, which can be replaced depending on which data source is being used.

In accordance with one possible example implementation, the client server application 708 may be implemented as a state machine having a number of application-sized DLLs. Thus, although actually realized as a combination of application modules, each of the server-based applications 710 will appear as separate applications to the user of the user interface device. Each of these DLLs can have separate routines to handle the state of a given form. The client server preferably maintains the current state of each server-based application 710 even when communication problems are reported by the server communication interface element 712. This feature allows the distributed UI system to maintain the various applications persistently regardless of the connection status of the user interface device. In addition, the client server application 708 preferably includes an API configured to register the server-based applications 710, and each individual application 710 can call another API to obtain a list of the server-based applications 710. In this manner, a listing of all available or supported applications 710 can be placed in a menu or control element (e.g., a "GO" menu) generated by each individual application 710.

In another possible implementation, the client server application 708 need not be realized as a state machine. In addition, although not a requirement of the present invention, any of the server-based applications 710 can be realized individually as a state machine. In this implementation, the individual applications 710 are not provided with the application list. Rather, client server application 708 can send the application list to the user interface device, which in turn makes it accessible from within any of the server-based applications 710. Alternatively, the client device may include a separate application that is devoted to the display of the application list.

The server-based applications 710 may communicate with any number of data source modules 722, which in turn obtain source data items from one or more data servers. The data source modules 722 may utilize any suitable communication protocol or model, e.g., the MICROSOFT™ OUTLOOK OBJECT MODEL (OOM), to communicate with the data servers. For example, multiple data source modules 722 may be suitably configured (in accordance with known techniques) to each communicate with one of the following server types: MICROSOFT EXCHANGE™, LOTUS NOTES™, POP3, and SMTP. Alternatively, a single data source module 722 could use a multi-source API, such as OOM, to communicate with any one of those data sources. Once obtaining the source data items, the data source modules 722 can function as an interface or an intermediary for the server-based applications 710 that process the source data items. In this respect, the server-based applications are configured to manipulate source data items for presentment and/or editing at the user interface device.

As mentioned briefly above, the client server processing architecture 702 preferably includes or communicates with the client forms database element 717. Client forms database element 717 preferably stores information related to the forms, controls, layouts, parameters, and/or characteristics associated with the application UIs. In a practical embodiment, the client forms database element 717 stores form definitions that are utilized by the client devices during UI processing and rendering. In the preferred embodiment, the UI controls, UI forms, and UI definitions are based (at least in part) upon a number of device capabilities for the respective client device. This functional relationship is depicted in FIG. 4, which shows the client forms database element 717 operatively coupled to the device capabilities storage element 720.

Any given control on a UI form can have a list of commands (or a script) to execute when the control is activated, manipulated, or selected by the end user (via, e.g., a button press, double-clicking on a listview item, making a listbox selection, or the like). These "scripting" commands may be a simple subset of the commands that the client server can send to the user interface device. These commands allow the client device to perform common actions locally without relying on the client server. Notably, the command scripts can be specified by the client server and communicated to the user interface device at an appropriate time (e.g., during an initialization session), or the command scripts can be pre-loaded into a suitable user interface device software application that is compatible with the corresponding client server application. Thus, although the command scripts are executed by the user interface device, they may originate at the client server.

The UI forms can be dynamically or statically defined as text files or in accordance with any suitable file format. The server-based applications 710 may also include a default dynamic layout generator to support new client device configurations or platforms. In addition, the client server application 708 and the applications 710 can be updated as necessary for compatibility with new client platforms. As noted previously, the client server architecture 702 is preferably in charge of most, if not all, of the UI details, which simplifies the user interface device processing and makes system updating easier.

Shadow cache 718, which is maintained by the client server, may include a list of source data items, UI form information, and other client-related data that has been transmitted from the client server to the user interface device. The shadow cache 718 may also include a list of new or modified data items, UI form information, and other client-related data received from the user interface device. Thus, the shadow cache 718 may contain data representing items transmitted from the client server to the user interface device and/or items that have been saved in the user interface device cache. The client server can interrogate the shadow cache 718 to determine the data cached at the user interface device, and update the shadow cache 718 in response to modifications to cached data entered by the user interface device. Shadow cache 718 allows the client server to monitor the status of the client cache, maintain synchronization with the user interface device, recognize when it is appropriate to "push" certain data types to the user interface device, support the persistent application states, and allows the client server application 708 to manage the downloading of new or modified information to the user interface device without repeatedly invoking applications 710.

The device capabilities storage element 720 is preferably accessible by each of the server-based applications 710. This storage element 720 stores the device capabilities of the respective user interface device. In the preferred embodiment, the client server obtains the device capabilities for each client device during the initial session. As used herein, "device capabilities" means any parameter, specification, requirement, limitation, physical or functional characteristic, identifying information, or status information for the client device. The client server utilizes one or more device capabilities to define the UI forms for the user interface device.

In embodiment, the user interface device application 728 (along with the communication interface element 730 and the OS-dependent code 732) is embedded in read-only memory in the user interface device. In a practical deployment, a given client device need not be upgradeable. Thus, the user interface device application 728 is preferably designed to be compatible with any number of client server versions. Although the user interface device application 728 may reside on a user interface device that is specifically designed for compatibility with the client, the user interface application 728 will likely be ported to many device platforms (possibly released by many different manufacturers). Accordingly, user interface device application 728 is preferably configured in a manner that isolates the platform-specific and/or OS-dependent code 732 (e.g., code associated with creating windows, allocating cache memory, displaying bitmaps, and the like).

Although multiple threads are not required, in the example embodiment, the user interface device application 728 includes three separate processing threads or modules: the client send (or response) thread 736, the client receive (or command) thread 738, and the client UI thread 740. The client receive thread 738 is dedicated to processing commands, source data items, and other information that come from the client server. The client receive thread 738 may communicate with the UI thread 740 and the client data caches 742. The receive thread 738 will basically sit in a loop while receiving commands from the client server. In response to the commands, the receive thread 738 may place data into data caches 742 or notify the UI thread 740 when it has work to do. Client receive thread 738 is capable of interrupting the other client elements if the command so requires (for example, if the command instructs the client device to switch to a new UI form).

To receive and process a command from the client server, the client receive element 738 calls a routine that waits for a full command to arrive at the socket (in a practical implementation, each command is preceded by a simple 16-bit length). If part of a command arrives and the rest does not arrive in a timely fashion, then the client receive element 738 may initiate a resend request. The client receive element 738 may also be responsible for decrypting and decompressing the received data, adjusting self-relative pointers, and placing the data into a suitable structure. Thereafter, the receive element 738 enters a switch statement based on the command type. For example, most commands will be to either set or modify data in the cache (and let the UI module 740 know of the change), or to tell the UI module 740 to make a change (e.g., move a control, load a new form, or the like). Consequently, the receive element preferably understands the format of all commands used by the client server and understands the details of the client caches 742.

The separate UI module 740 is preferably dedicated to UI tasks, such as drawing UI forms, displaying the data that arrived in the client receive element 738, and acting on commands given by the user. The UI module 740 waits for commands from the client receive element 738 and commands generated by end user manipulation of the user interface device. The UI module 740 also understands the client data caches 742, so that it can update the UI display when ordered to do so by the receive element 738. For example, if the UI module 740 needs some data items that are not in the data caches 742, it will request such data via the client send element 736 (but not display it until told to do so by the receive element 738). In response to a user action, the UI module 740 may poll a cached table of "script" commands to determine what action the user interface device should take. The data may include a token or other suitable identifier to specify which form was active when the user interface device requested more information (the user could have switched to a different form while waiting for additional data). These tokens can be provided by the client server along with the data; the user interface device may handle the tokens like opaque identifiers.

The client send element 736 is dedicated to sending data to the client server. In one embodiment, the client send element 736 is separate from the UI module 740 so that the user interface device can easily resend lost data packets. The send element 736 will largely send information to the client server as requested by the UI module 740. The send element 736 may also collude with the receive element 738 to ensure that transmitted requests are acknowledged in a reasonable amount of time; if not, the request can be resent. In the preferred embodiment, a server acknowledgement is monitored for all information sent to the client server. This allows the user interface device to keep track of data the server hasn't received. Similarly, when the client server sends multi-part replies in response to a client request, the client server preferably sends the response acknowledgement with the last part.

The send element 736 may also be configured to obtain data from the UI module 740 and call a routine to turn it into socket data (or into any suitable data format compatible with the current data communication scheme). The send element 736 can also prepend command length and command identification (which gets acknowledged by the client server, so that the user interface device can tell that the communication was successful), make pointers self-relative, compress the data, encrypt it, and send it to the client server.

In the example embodiment, the first time the client server connects to the user interface device, the details of how the controls are to be arranged are cached and an application identification is associated with them. From that point on, unless otherwise stipulated by the server, that application facade will be built from the cached UI form data. The client server need not be consulted with regard to the stored UI layouts. In addition, individual UI elements need not be actually downloaded. Instead, the client server can simply send directions to the user interface device, instructing the user interface device to use native OS GUI elements, which are already on the client as part of the client platform OS. Leveraging native controls improves performance and provides a more interactive, fat client feel to the remote application. In addition, such leveraging lowers the overall network bandwidth requirements.

In accordance with one example implementation, the procedure for sending and receiving data and commands is essentially the same for the client server and the user interface device. Each side maintains two queues of data packets: one is a list of unsent packets and the other is a list of packets that were sent but have not been acknowledged by the other side. Once a connection is established, the send element looks at any data in the "send" queue and proceeds to send the data packets (in order) across the connection. After a successful send operation, the packet gets moved to the back of the "sent" queue (assuming that no exceptions exist).

Meanwhile, the receive element sits and waits for data to arrive from the other side. When a complete packet or command arrives, the receive element analyzes the packet header to determine whether the current packet is an unsolicited packet or a packet meant as a receipt acknowledgement. For instance, the user interface device can make this determination by checking whether the current command is in the range of client commands or in the range of server commands. A client command implies that the current packet is simply an acknowledgement from the server and that the associated packet sent earlier by the client has been received. If the current packet is indeed an acknowledgement packet, then the receive element looks at the front of the "sent" queue and removes the corresponding packet. That packet has now been successfully received and need not be monitored any longer.

If the received packet is an unsolicited command, then the recipient should immediately acknowledge the packet. An acknowledgement packet is created and placed into the "send" queue. The send element will see this packet as it processes the "send" queue and send it to the other side. However, it will not move the acknowledgement packet into the "sent" queue after sending.

For recovery after a session has been interrupted and is reconnected, each side is responsible for ensuring that possibly lost data is resent in the correct order. To this end, each side places its entire "sent" queue to the front of the "send" queue or into a "resend" queue. This reprioritization ensures that any data that has not been verifiably received by the other side will be sent in the proper order. This scheme creates a problem in that it is possible for a packet that was indeed received by the other side to be resent if an acknowledgement has not yet been sent or received. This problem can be addressed by handling acknowledgements for unsolicited commands in a slightly different manner. For example, each side can remember a place-holder for the last acknowledge packet it sends. When it receives a new unsolicited packet with a placeholder less than the last acknowledged placeholder, it recognizes the new unsolicited packet as a resend of something that it has already processed. Thus, it can send another acknowledge and discard the new.

Although the present disclosure has been described with reference to preferred embodiments, workers skilled in the art will recognize that changes can be made in form and detail without departing from the spirit and scope of the present disclosure.

What is claimed is:

1. A portable user interface device for performing wireless communications, the device comprising:
   a case;
   a display screen maintained by the case and forming a display side;
   a speaker maintained by the case;
   a microphone maintained by the case;
   a first sensor maintained by the case adjacent the display side;
   a computer maintained by the case behind the display screen opposite the display side, the computer programmed to control operation of the display screen and operate:
      a wireless form-filling module with limited size data transfer capacity,
      a wireless data transfer module including a wireless transceiver and adapted to communicate with a data transfer service on a non-priority, limited size basis,
      an application module adapted to facilitate performance of a designated operation by a user via the form-filling module and the data transfer module, wherein the application module prompts automatic display of assigned title indicia on the display screen immediately adjacent the first sensor and performs the designated operation as a function of an input signal from the first sensor.

2. The device of claim 1, wherein the data transfer module is adapted to wirelessly transmit information generated by the application module.

3. The device of claim 2, wherein the data transfer module is further adapted to include an electronic key with the transmission of information generated by the application module, the electronic key formatted to identify the data transmission to a data transfer service as being a non-priority transmission to be processed by the data transfer service on a non-priority basis.

4. The device of claim 1, wherein the data transfer module is programmed to establish a pre-determined limit on a size of an outgoing data transmission from the device.

5. The device of claim 1, wherein the user interface module is programmed to establish a pre-determined limit on a size of data deliverable by the application module to the data transfer module.

6. The device of claim 1, wherein the designated operation is a voice messaging operation in which the computer records an oral message by the user via the microphone, assigns a designated recipient to the recorded message, and wirelessly transmits the recorded message along with information indicative of the designated recipient.

7. The device of claim 6, wherein the voice messaging operation includes the computer programmed to establish a maximum length of time of a recorded message as a function of the limited size data transfer capacity, and further to prompt display of messaging indicia relating to the maximum length of time in connection with recording of a current message.

8. The device of claim 7, wherein the messaging indicia is continuously displayed to a user while recording the current message, the displayed messaging indicia being at least periodically updated to inform the user of a comparison of a length of time of the current message with the maximum length of time.

9. The device of claim 6, wherein the assigned title indicia relates to contact information of available recipients.

10. The device of claim 9, wherein the device further includes a second sensor maintained by the case immediately adjacent the display screen and spaced from the first sensor, the messaging operation further including the computer programmed to automatically prompt display of second assigned indicia relating to a send command immediately adjacent the second sensor.

11. The device of claim 1, wherein the case defines a first side edge forming a first notch, and further wherein the first sensor includes an actuator disposed within the first notch.

12. The device of claim 11, wherein the first notch is dimensioned in accordance with an adult human fingertip form factor.

13. The device of claim 12, wherein the actuator forms a user contact surface, and further wherein the user contact surface is maintained within a depth of the first notch.

14. The device of claim 11, wherein the case further defines a second side edge forming a second notch, and further wherein the device includes a second sensor having an actuator disposed within the second notch and the application module is programmed to prompt automatic display of assigned title indicia immediately adjacent the second notch and indicative of an action associated with the designated operation, the action being implemented by the computer upon actuation of the second sensor.

15. The device of claim 14, wherein the case further defines third and fourth side edges each forming a notch within which an actuator portion of third and fourth sensors are disposed, respectively.

16. The device of claim 1, further comprising a secondary computer connection port for electronically connecting the computer to a secondary computer having internet connection capabilities, and wherein the computer is programmed to prompt user alteration of the assigned title indicia upon electronic connection of the computer to an assigned internet website via the secondary computer.

17. The device of claim 16, wherein the computer is further programmed to permit user modification of the application module upon electronic connection of the computer to the assigned internet website via the secondary computer.

18. A method for performing wireless communication comprising:
   providing a mobile user interface device including:
      a case,
      a display screen maintained by the case and forming a display side,
      a speaker maintained by the case,
      a microphone maintained by the case,
      a first sensor maintained by the case adjacent the display side,
      a computer maintained by the case behind the display screen opposite the display side, the computer programmed to control operation of the display screen and operate:
         a wireless form-filling module with limited size data transfer capacity,
         a wireless data transfer module including a wireless transceiver and adapted to communicate with a data transfer service on a non-priority, limited size basis,
         an application module adapted to facilitate performance of a designated operation by a user via the form-filling module and the data transfer module, wherein the application module prompts automatic display of assigned title indicia on the display screen immediately adjacent the first sensor and performs the designated operation as a function of an input signal from the first sensor;

operating the device to record a voice message from a user, including:
- displaying a voice message user interface form on the display screen,
- prompting the user to orally enter a time-limited voice message via the microphone,
- storing the voice message in a memory of the computer;

electronically associating a device identification key with the stored voice message to generate a voice message data string;

wirelessly signaling the voice message data string from the device to a transceiver tower of a data transfer service, wherein the data transfer service recognizes the voice message data string as a non-priority item based upon reference to the key; and wirelessly signaling the voice message data string from the data transfer service to a client server.

19. The method of claim 18, wherein prompting the user to orally enter a time-limited voice message includes:
- establishing a maximum message length of time; and
- displaying indicia on the display screen indicative of a comparison of a current length of time of a message being recorded relative to the maximum message length of time.

20. The method of claim 18, further comprising:
- connecting the device to a secondary computer;
- electronically connecting the secondary computer to a designated website via the internet; and
- altering a portion of a form operated by the application module via the secondary computer and the website.

* * * * *